US005559544A

United States Patent [19]

Sato

[11] Patent Number: 5,559,544

[45] Date of Patent: Sep. 24, 1996

[54] IMAGE FORMING APPARATUS WITH COOPERATING HOUSING STRUCTURE

[75] Inventor: Shougo Sato, Nagoya, Japan

[73] Assignee: Brother Kogyo Kabushiki Kaisha, Nagoya, Japan

[21] Appl. No.: 190,497

[22] Filed: Feb. 2, 1994

[30] Foreign Application Priority Data

May 31, 1993 [JP] Japan .................................... 5-128730

[51] Int. Cl.[6] ................................ B41J 2/415; B41J 2/41; B41J 2/385; G01D 15/06

[52] U.S. Cl. ............................ 347/127; 347/126; 347/128; 347/112; 347/111

[58] Field of Search ............................ 430/122; 347/126, 347/127, 128, 112, 111

[56] References Cited

U.S. PATENT DOCUMENTS

| | | | |
|---|---|---|---|
| 3,689,935 | 9/1972 | Pressman et al. . | |
| 4,386,577 | 6/1983 | Hosono et al. | 430/122 |
| 4,462,677 | 7/1984 | Onoda . | |
| 4,673,956 | 6/1987 | Kobayashi . | |
| 4,680,245 | 7/1987 | Suematsu | 430/122 |
| 4,890,123 | 12/1989 | McCallum et al. | 347/127 |
| 5,036,341 | 7/1991 | Larsson . | |
| 5,374,949 | 12/1994 | Wada et al. | 347/112 |

FOREIGN PATENT DOCUMENTS

| | | |
|---|---|---|
| 4038085A1 | 7/1991 | Germany . |
| 3-168770 | 7/1991 | Japan . |
| 5-24248 | 2/1993 | Japan . |

*Primary Examiner*—Benjamin R. Fuller
*Assistant Examiner*—Raquel Yvette Gordon
*Attorney, Agent, or Firm*—Oliff & Berridge

[57] ABSTRACT

In an image forming apparatus, an aperture electrode member, a toner supply device, a fixing device, a main power source and a main base plate are mounted to a main body case while a back electrode roller is disposed on a lid member. When the lid member is closed, the aperture electrode member and the back electrode roller are kept at a 1 mm gap interval. On the other hand, when the lid member is opened, the aperture electrode member and the back electrode roller are completely separated from each other, so that the aperture electrode member can be easily cleaned.

24 Claims, 10 Drawing Sheets

IMAGE FORMING APPARATUS WITH COOPERATING HOUSING STRUCTURE

BACKGROUND OF THE INVENTION

1. Field of the Invention

This invention relates to an image forming apparatus for use in a copying machine, a printer, a plotter, a facsimile machine or similar machine.

2. Description of Related Art

One type of conventional image forming apparatus uses an electrode having plural opening portions (hereinafter referred to as "apertures") as disclosed in U.S. Pat. No. 3,689,935. In this image forming apparatus, a voltage is applied to the electrode while being modulated according to image data to thereby control the passage of toner through the apertures and form an image on a supporter with the passed toner.

This image forming apparatus includes an insulating flat plate, a continuous reference electrode formed on one surface of the flat plate, and plural control electrodes formed on the other surface of the flat plate and electrically insulated from one another. The apparatus further includes an aperture electrode member having at least one array of apertures, each of which is provided in correspondence with each control electrode to penetrate through the flat plate, the reference electrode and the control electrode. Also provided are means for selectively applying potential between the reference electrode and each of the control electrodes and means for supplying charged toner to modulate the flow of toner that has just passed through the apertures according to the supplied potential. There is also means for positioning the supporter in a toner-particle flowing passage such that the supporter and the aperture electrode member are movable relative to each other. In the image forming apparatus thus constructed, a back electrode roller is rotatably disposed to confront the aperture electrode yet be spaced from the aperture electrode, for example, by 1 mm (that is, to maintain a 1 mm gap therebetween.)

However, in the conventional image forming apparatus described above, the toner is likely to adhere to the apertures of the aperture electrode member so that the apertures become clogged with toner. This clogging of the toner disturbs the formation of an image. In addition, toner that has already adhered to the supporter can then fall down from the supporter and become laminated on the aperture electrodes. The laminated toner from the aperture electrodes will then adhere to a fed supporter and disturb an image on the supporter.

To solve the above problems, the aperture electrode member must be periodically cleaned. However, as described above, the gap between the aperture electrode member and the back electrode roller is kept to about 1 mm. Thus, the cleaning work is very difficult..

SUMMARY OF THE INVENTION

An object of this invention is to provide an image forming apparatus in which an aperture electrode member and a back electrode are designed to be easily separated from each other, thereby facilitating cleaning of the aperture electrode member.

To attain the above and other objects, the image forming apparatus according to this invention includes a toner carrier for carrying toner on the surface thereof, an aperture electrode member having plural openings through which the toner is passed, and a back electrode located at an opposite position to the toner carrier with respect to the aperture electrode member so as to confront the toner carrier and be spaced from the aperture electrode at a predetermined interval. An electric field is generated in a gap between the back electrode and the aperture electrode member upon application of voltage thereto. The image forming apparatus also has a frame for supporting the toner carrier, the aperture electrode member and the back electrode. The frame is divided into two sub frames, and these sub frames are linked to each other such that they can be moved toward and away from each other through relative rotational motion. The aperture electrode member and the toner carrier are supported by one sub frame while the back electrode is supported by the other sub frame.

In this image forming apparatus, when the sub frames are moved away from each other through the relative rotational motion thereof, the aperture electrode member and the back electrode are sufficiently spaced from each other to allow cleaning of the aperture electrode member to be easily performed.

As described above, according to the image forming apparatus of this invention, when the sub frames are spaced from each other, the aperture electrode member and the back electrode are also spaced from each other. This state enables a cleaning means, such as a brush, a cotton swab or the like, to directly contact with the aperture electrode member. Thus, cleaning of the aperture electrode member can be easily performed.

BRIEF DESCRIPTION OF THE DRAWINGS

Preferred embodiments of the present invention are described in detail referring to the following figures wherein.

DETAILED DESCRIPTION OF PREFERRED EMBODIMENTS

Preferred embodiments according to this invention are described referring to the accompanying drawings.

Figure 1:
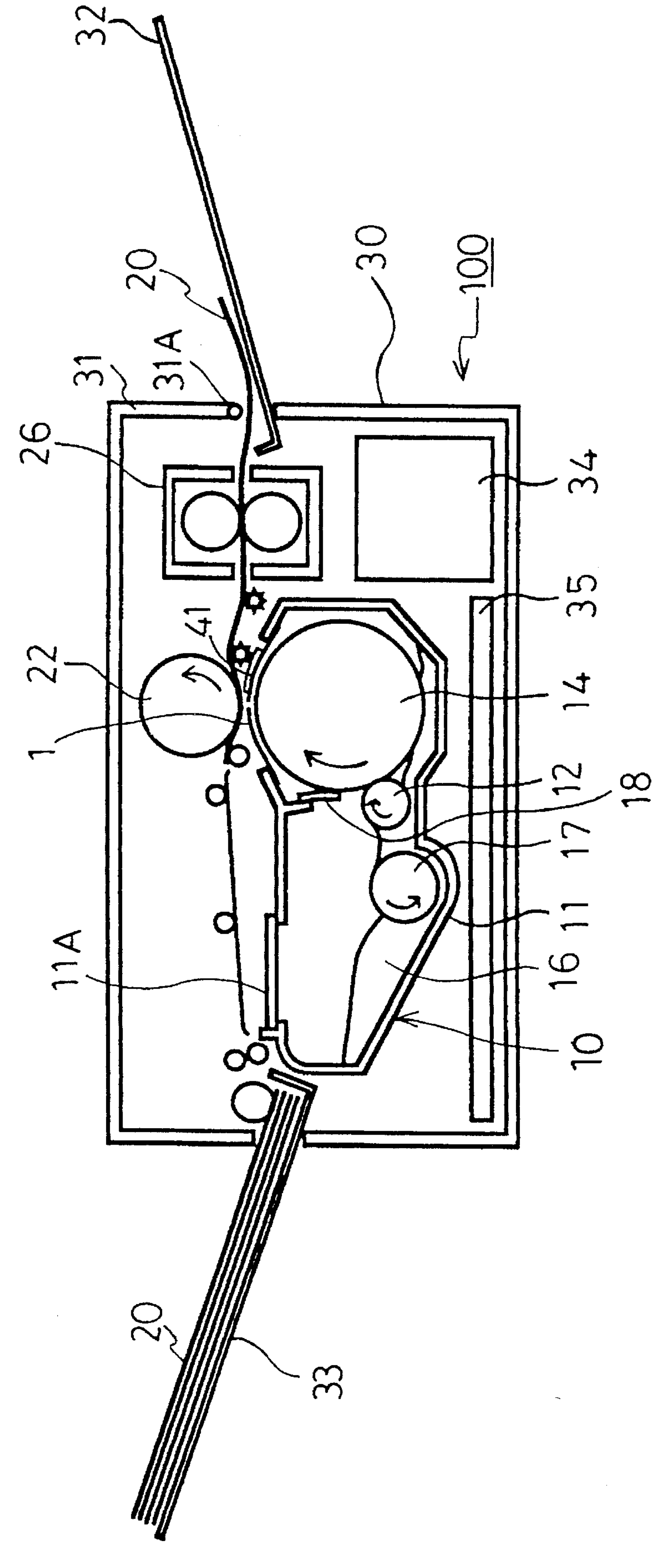
FIG. 1 is a schematic side view showing the construction of an image forming apparatus of a first embodiment.

FIG. 1 schematically shows the construction of the image forming apparatus according to a preferred embodiment. A cylindrical back electrode roller 22 is disposed above an aperture electrode member 1 having apertures 6, shown in FIG. 3, which control toner-flow, and is spaced from the aperture electrode member 1 by approximately 1 mm. The back electrode roller 22 is rotatable in a direction as indicated by the arrow in FIG. 1. A printing medium 20 is inserted into the 1 mm gap between the back electrode roller 22 and the aperture electrode member 1 and is fed through the gap during operation. A cover 41 for covering the apertures 6 is provided above the aperture electrode 1, and a toner supply device 10 is disposed below the aperture electrode member 1 along the longitudinal direction of the aperture electrode member 1. Further, a fixing device 26 for fixing toner 16 onto the surface of the printing medium 20 by heat and pressure is provided in the travelling direction of the printing medium 20, which is fed by the back electrode roller 22.

The elements described above, a main power source 34 and a main base plate 35 are supported inside of a frame 100 comprising a main body case 30 and a lid member 31. The lid member 31 is linked to the main body 30 to be swingable around its rotational axis 31A in the direction indicated by an arrow A in FIG. 2. A printing medium supply tray 33 and a printing medium discharge tray 32 are also provided outside of the main body case 30.

In this apparatus, the aperture electrode member 1, the toner supply device 10, the fixing device 26, the main power source 34 and the main base plate 35 are mounted in the main body case 30. The back electrode roller 22 is mounted in the lid member 31. When the lid member 31 is closed (see FIG. 1), the cover 41 is kept in a standby state so that the apertures 6 of the aperture electrode member 1 are opened. Accordingly, in this state, the aperture electrode member 1 and the back electrode roller 22 are disposed so that the gap therebetween is kept at a 1 mm interval as described above. On the other hand, when the lid member 31 is open (see FIG. 2), the aperture electrode member 1 and the back electrode roller 22 are completely separated from each other. With the opening of the lid member 31, the cover 41 is shifted to a position to cover the apertures 6.

The operation of the cover 41, which is designed to work in combination with the opening and closing operation of the lid member 31, is described with reference to FIGS. 8 to 11.

Figure 8:
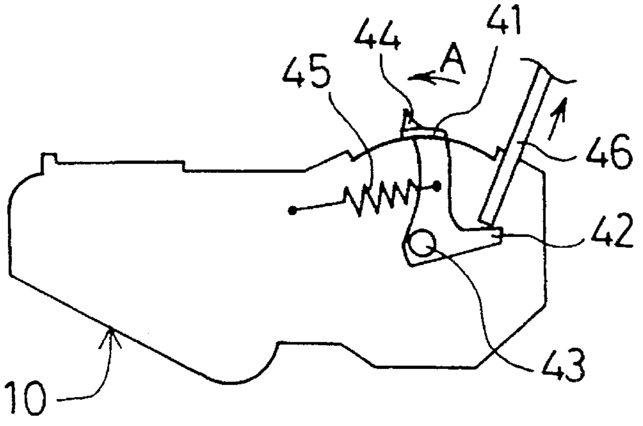
FIG. 8 is a schematic side view showing the detailed construction of an electrode protection mechanism in one position.
Figure 9:
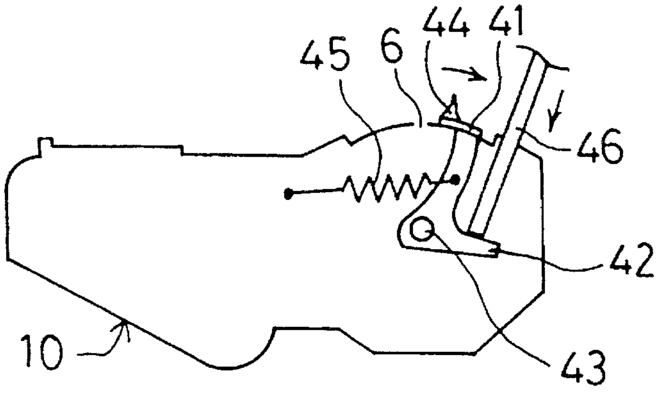
FIG. 9 is a side view showing the detailed construction of the electrode protection mechanism in another position.

FIG. 8 is a schematic view showing the operation of an electrode protection mechanism when the lid member 31 is opened, and FIG. 9 is a schematic view showing the operation of the electrode protection mechanism when the lid member 31 is closed. The electrode protection mechanism comprises the cover 41 provided on the toner supply device 10, a lever 42, a support pin 43, an open tab 44, a spring 45 and a press rod 46, which is provided on the lid member 31. The cover 41, the lever 42 and the open tab 44 are integrally formed as a unit and are designed to be swingable to a predetermined position by the support pin 43, the spring 45 and the press rod 46.

When the lid member 31 is closed, that is, when the device is in a print state, the press rod 46 is moved downwardly by the downward rotation of the lid member 31. At this time, the press rod 46 presses the end portion of the lever 42 so that the lever 42 is rotated around the support pin 43 in the direction as indicated by the arrows of FIG. 9, with the integral cover 41 also rotating. Through this operation, the cover 41 is moved from the apertures 6, and a print operation is allowed to be carried out.

On the other hand, when the lid member 31 is opened, the press rod 46 is moved upwardly. At this time, the lever 42 is pulled by the spring 45 to rotate around the support pin 43 in the direction indicated by the arrow A in FIG. 8. Thus, the cover 41 is moved to cover the apertures 6. Through this operation, the aperture electrode member 1 is protected when the lid member 31 is open.

Further, to clean the aperture electrode member 1 when the lid member 31 is open, the cover 41, which is normally closed, can be opened as follows.

Figure 10:
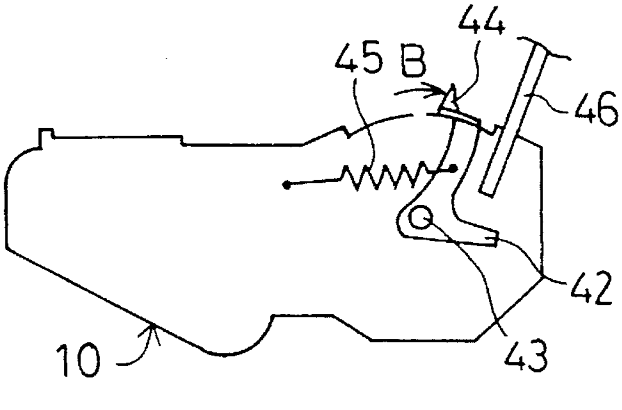
FIG. 10 is a side view showing the detailed construction of the electrode protection mechanism in yet another position.
Figure 11:
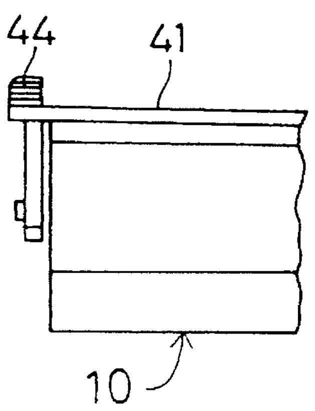
FIG. 11 is a partial front view showing the detailed construction of the electrode protection mechanism.

The user moves the open tab 44 provided on the end portion of the cover 41 in the direction as indicated by an arrow B of FIG. 10. At this time, if a user's force exceeds extension of the spring 45, the lever 42 is rotated around the support pin 43, so that the cover 41 can be opened. Through this operation, the user can perform maintenance of the apparatus such as cleaning of the aperture electrode member 1.

Referring back to FIGS. 1 and 2, the toner supply device 10 includes a toner case 11 serving as a housing for the whole toner supply device 10, toner 16 accommodated in the toner case 11, a toner supply roller 12, a toner carry roller 14, a toner layer adjusting blade 18, and an auger 17. In this toner supply device 10, the toner carry roller 14 carries the toner 16 thereon and feeds the toner 16 toward the aperture electrode member 1. The toner carry rioter 14 is formed of conductive material, such as aluminum or the like, and is designed in a hollow cylindrical shape. The toner supply roller 12 supplies the toner 16 in the toner case 11 to the toner carry roller 14. The auger 17 prevents the toner 16 in the toner case from being concentrated in the longitudinal direction of the toner carry roller 14.

The toner supply roller 12, the toner carry roller 14 and the auger 17 are supported to be rotatable in the directions indicated by the arrows in FIG. 1. The toner supply roller 12 and the toner carry roller 14 are disposed in contact with and parallel to each other. The toner layer adjusting blade 18 adjusts the toner amount on the toner carry roller 14 so that the toner 16 is uniformly carried on the surface of the toner carry roller 14 and is uniformly charged. The toner layer adjusting blade 18 contacts with the toner carry roller 14 under pressure.

Figure 3:
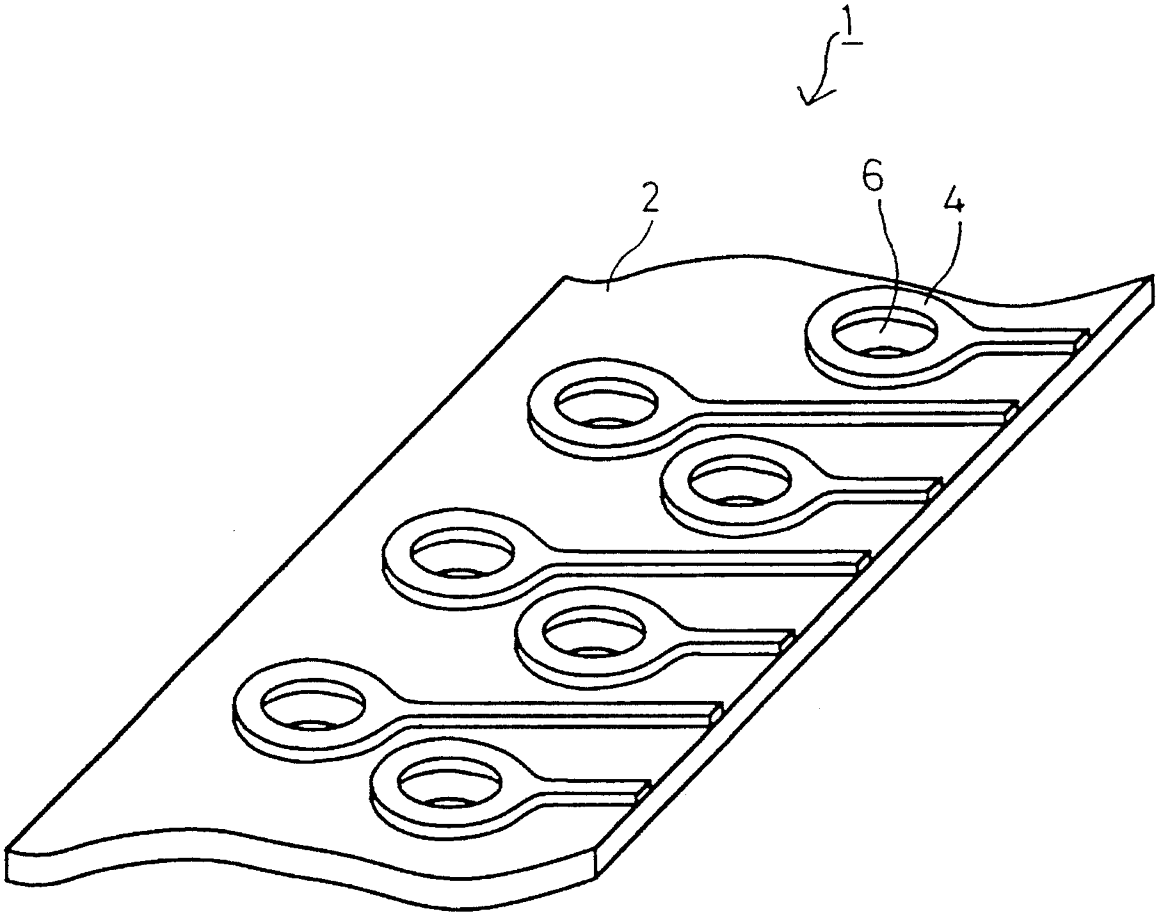
FIG. 3 is a partial perspective view showing the construction of an aperture electrode member used in the image forming apparatus of the first embodiment.
Figure 4:
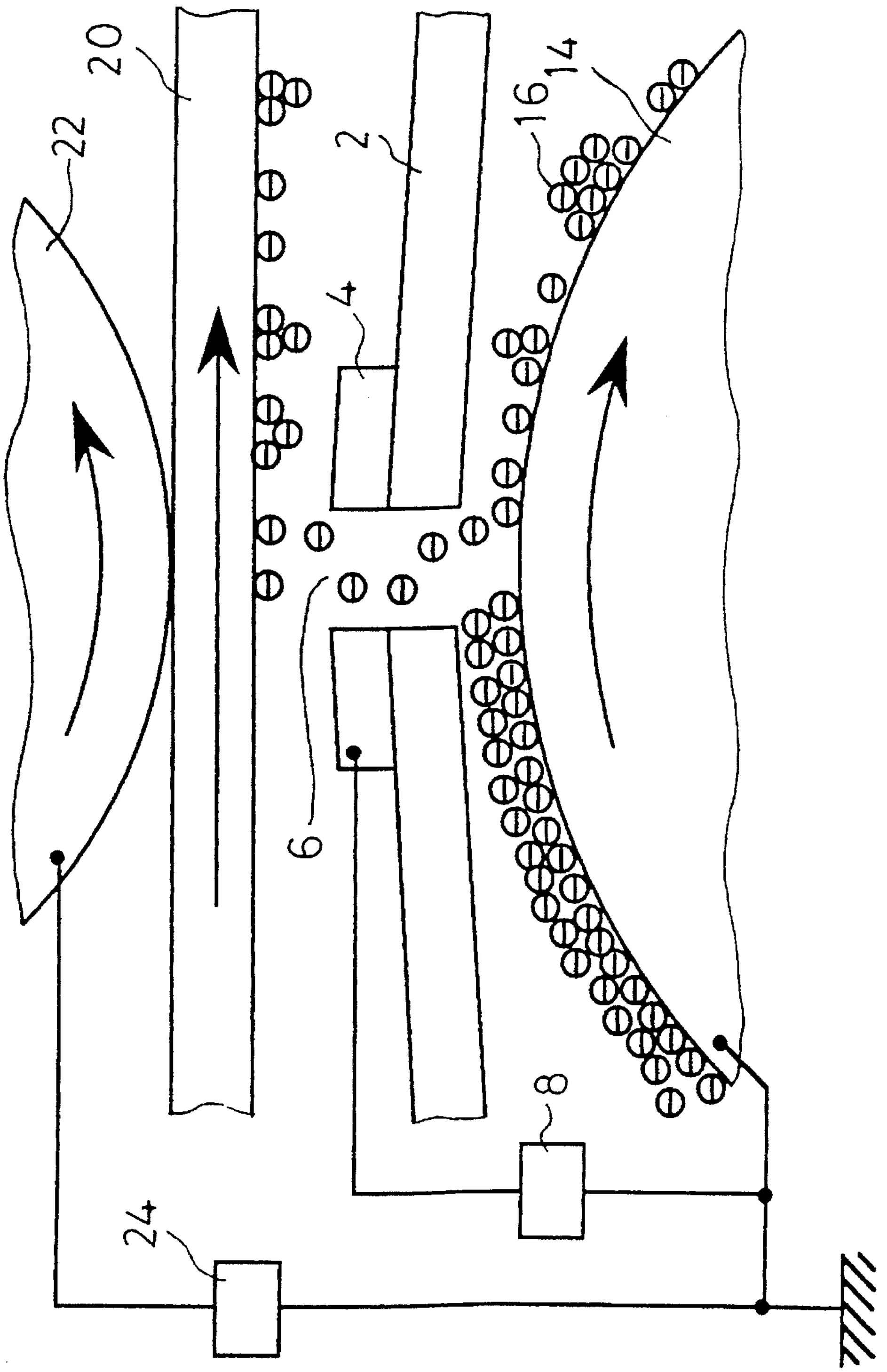
FIG. 4 is a partial schematic side view showing the movement of toner in the vicinity of the aperture electrode member used in the image forming apparatus of the first embodiment.

As shown in FIG. 3, the aperture electrode 1 preferably comprises a 25 μm-thick insulating sheet 2 of a polyimide. Two aperture arrays, each of which is formed in the insulating sheet 2, include plural apertures 6 of approximately 100 μm in diameter. Control electrodes 4 of 1 μm thickness are formed in correspondence with the respective apertures 6 on one surface of the sheet 2, which confront the back electrode roller 22 as shown in FIG. 4. In this embodiment, the apertures 6 are arranged in two rows on the insulating sheet 2. However, they may be arranged in one row or three or more rows. Increase in number aperture arrays enables an image to be formed with high resolution.

The aperture electrode member 1 is disposed at such a position that the control electrodes 4 confront the printing medium 20. At the aperture position, the insulating sheet 2 contacts with the toner 16 on the toner carry roller 14 as shown in FIG. 4.

Further, the toner carry roller 14 is grounded, and a control voltage applying circuit 8 is connected across the control electrodes 4 and the toner carry roller 14. The control voltage applying circuit 8 is so designed to apply a voltage of 0 V or +50 V to the control electrodes 4 on the basis of an image signal.

Still further, a DC power source 24 is connected across the back electrode roller 22 and the toner carry roller 14. The DC power source 24 applies a voltage of +1 kV to the back electrode roller 22.

Figure 5A:
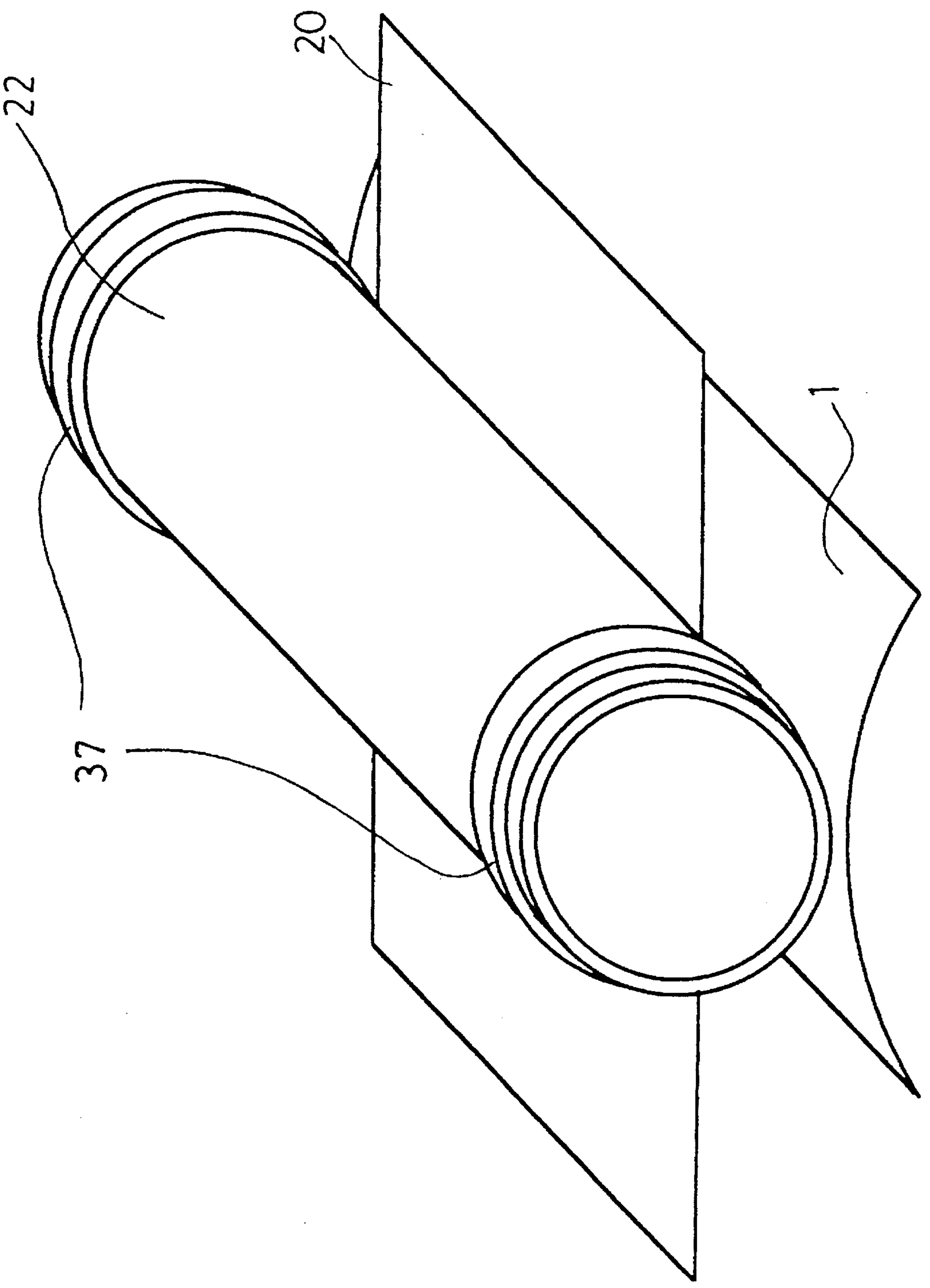
FIG. 5A is a perspective view showing the construction of a spacer provided on a back electrode used in the image forming apparatus of the first embodiment.
Figure 5B:
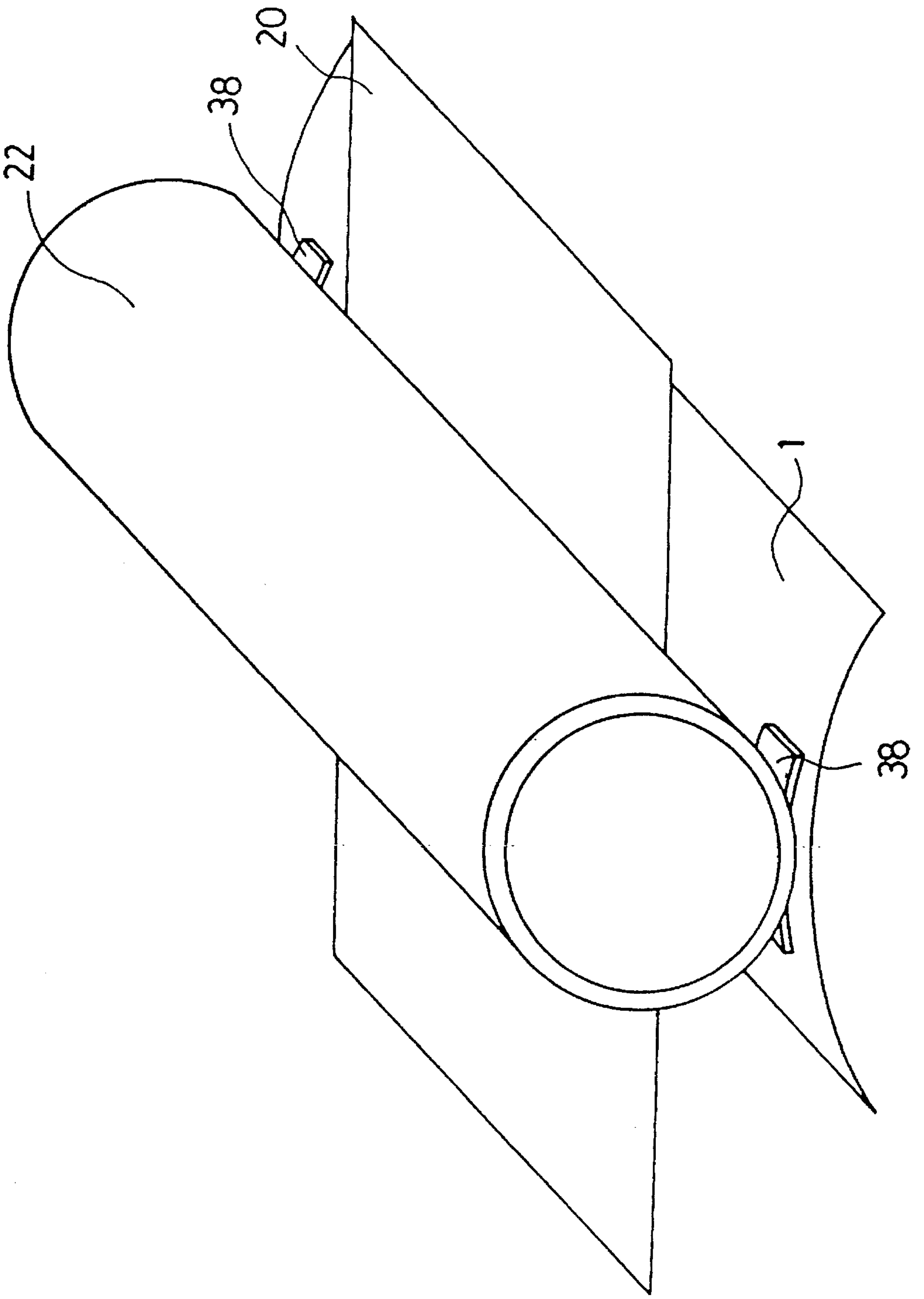
FIG. 5B is a perspective view showing the construction of another spacer provided on the aperture electrode member.

To keep the gap interval of 1 mm between the back electrode roller 22 and the aperture electrode 1, regardless of the repetitive opening and closing of the lid member 31, a spacer 37 is provided at both ends of the back electrode 22 that are not associated with the image formation as shown in FIG. 5A. The spacer 37 may be provided at both ends of the aperture electrode member 1 or may be provided on the insulating sheet 2 of the aperture electrode member 1, shown as spacer 38 in FIG. 5B. Also, the spacer may be provided at the upstream side of the travelling direction of the printing medium with respect to the apertures. The spacer may be designed to maintain any desired minimum spacing.

The operation of the image forming apparatus thus constructed is described with reference to FIGS. 1 and 4. When the toner carry roller 14 and the toner supply roller 12 are rotated in the direction as indicated by the arrows of FIGS. 1 and 4, the toner 16 supplied from the toner supply roller 12 is rubbed against the toner carry roller 14 to be negatively charged. Then, the toner 16 is carried on the surface of the toner carry roller 14. The toner 16, which has been carried on the toner carry roller 14, is thinly layered by the toner layer adjusting blade 18 and charged. Then, the toner 16 is fed toward the lower side of the aperture electrode member 1 through the rotation of the toner carry roller 14. The toner 16 on the toner carry roller 14 is supplied to the lower side of the apertures 6 while being rubbed against the insulating sheet 2 of the aperture electrode 1.

At this time, in accordance with an image signal, a voltage of +50 V is applied from the control voltage applying circuit 8 to those control electrodes 4 that correspond to an image portion. So, due to the potential difference between the control electrode 4 and the toner carry roller 14, an electric line of force from the control electrodes 4 to the toner carry roller 14 is formed near the apertures 6.that correspond to the control electrodes 4 applied with the voltage. By this electric line of force, electrostatic force is applied to the negatively-charged toner 16 in a higher potential direction. So, the toner 16 is attracted from the surface of the toner carry roller 14 through the apertures 6 to the side of the control electrodes 4.

The printing medium 20 is then fed into the gap between the back electrode roller 22 and the aperture electrode member 1 by the sheet supply tray 33. Further, the toner 16, which has drawn out to the side of the control electrodes 4 further migrates toward the printing medium 20 by the electric field formed between the printing medium 20 and the control electrodes 4, which is caused by the voltage applied to the back electrode roller 22. Finally, the toner 16 is deposited on the printing medium 20 to form a toner image.

Furthers the control electrodes 4 corresponding to a portion irrelevant to the image formation (image-irrelevant portion) is supplied with a voltage of 0 V from the control voltage applying circuit 8. As a result, no electric field is generated between the toner carry roller 14 and the control electrodes 4, and no electrostatic force is applied to the toner 16 on the toner carry roller 14. Accordingly, the toner 16 is still attracted to the toner carry roller 14. Thus, no toner is passed through the apertures 6.

Further, the printing medium 20 is fed by the length corresponding to the width of the apertures in the direction vertical to the aperture arrays while an image is formed on the printing medium 20 with the toner 16 by the front aperture array (the apertures located at the front side) of the two aperture arrays. So, an image is allowed to be formed by the rear aperture array (the other apertures located at the rear side) of the two aperture arrays. By repeating the above process, a toner image is formed on the whole surface of the printing medium 20. Thereafter, the toner image thus formed is fixed on the printing medium 20 by pressurizing and heating the printing medium 20 using a well-known fixing device 26. Then, the printing medium 20 is discharged onto the printing medium discharge tray 32.

If insulating toner is used in the image forming apparatus thus constructed, the insulation between the toner carry roller 14 and the control electrodes 4 is retained. So, the apertures 6 can be prevented from being broken.

Further in the image forming apparatus of this embodiment, the back electrode roller 22 is supported by the lid member 31, and the aperture electrode member 1 is supported by the main body case 30. Accordingly, by rotating the lid member 31 around the rotational axis 31A in the direction indicated by the arrow A shown in FIG. 2, the aperture electrode member 1 and the back electrode roller 22 are completely separated from each other. Further, in conjunction with the opening of the lid member 31, the cover 41 of the aperture electrode member 1 covers the apertures 6. Therefore, when the lid member 31 is opened, the aperture electrode member 1 is protected by the cover 41 and thus prevented from being damaged. In addition, the cleaning of the aperture electrode member 1, for example, removal of unnecessary toner remaining in the aperture electrode member 1, can be easily performed with a brush, a cotton swab, or the like by manually opening the cover 41 with the open tab 44.

Thereafter, the lid member 31 is closed, and the cover 41 simultaneously covers the apertures 6. At this time, the back electrode roller 22 and the aperture electrode member 1 approach each other. However, the gap interval between the back electrode roller 22 and the aperture electrode member 1 is kept to 1 mm at all times regardless of the repetitive opening and closing of the lid member 31 because the spacer 37 is provided between both end portions of the back electrode roller 22 as described above.

Figure 12:
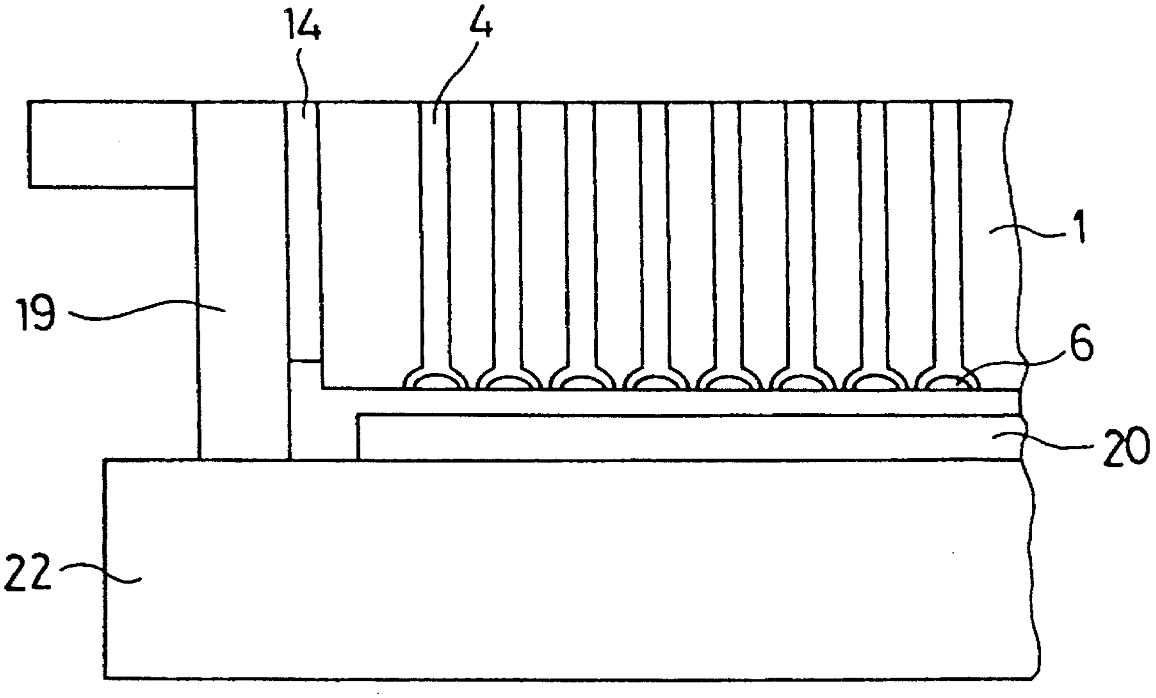
FIG. 12 is a partial front view showing another embodiment of a spacer provided on the toner carry roller.

In place of the construction of the spacer 37, a spacer 19 as shown in FIG. 12 may be used. In this case, a rim-shaped spacer 19 is provided at the end portion of the carry roller 14. This spacer 19 is in contact with the cylindrical back electrode roller 22. The printing medium 20 is fed through a space defined by the aperture electrode member 1 and the back electrode roller 22. Since the spacer 19 and the surface of the printing medium 20 are not in contact with each other during or after a print operation, a uniform gap can be set without forming a non-print portion on the printing medium 20. Thus, an excellent print result can be obtained.

Figure 2:
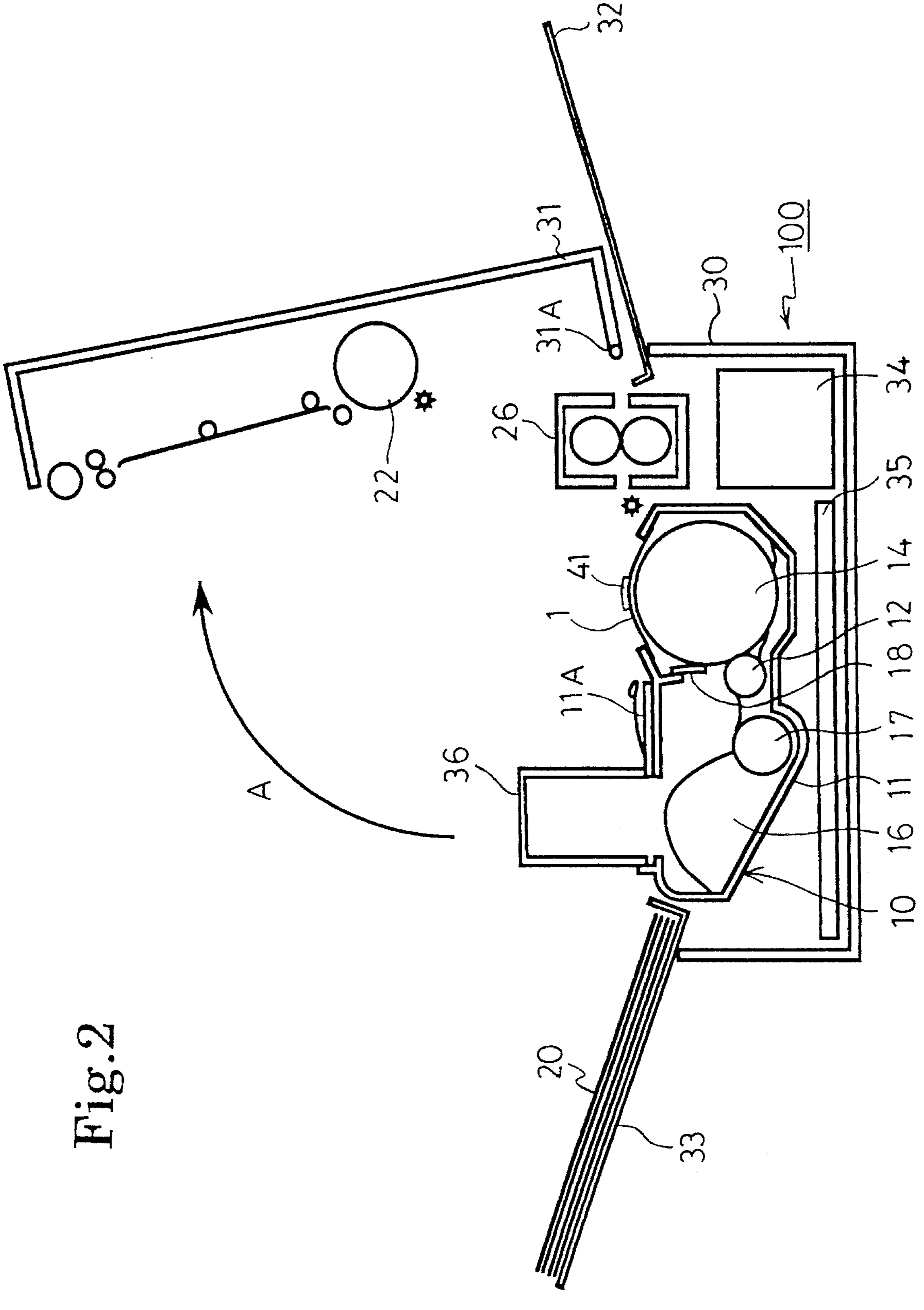
FIG. 2 is a schematic side view similar to FIG. 1 showing the state where a lid member of the image forming apparatus of the first embodiment is opened.

The upper surface of the toner case 11 is exposed to the outside when the lid member 31 is opened. However, if an opening portion 11A is provided above the toner case as shown in FIG. 2, which can be opened or closed, the toner 16 can be easily supplied through the opening portion 11A into the toner case 11 from a supplemental toner box 36.

This invention is not limited to the above embodiments, and various modifications may be made without departing from the spirit and scope of this invention.

Figure 6:
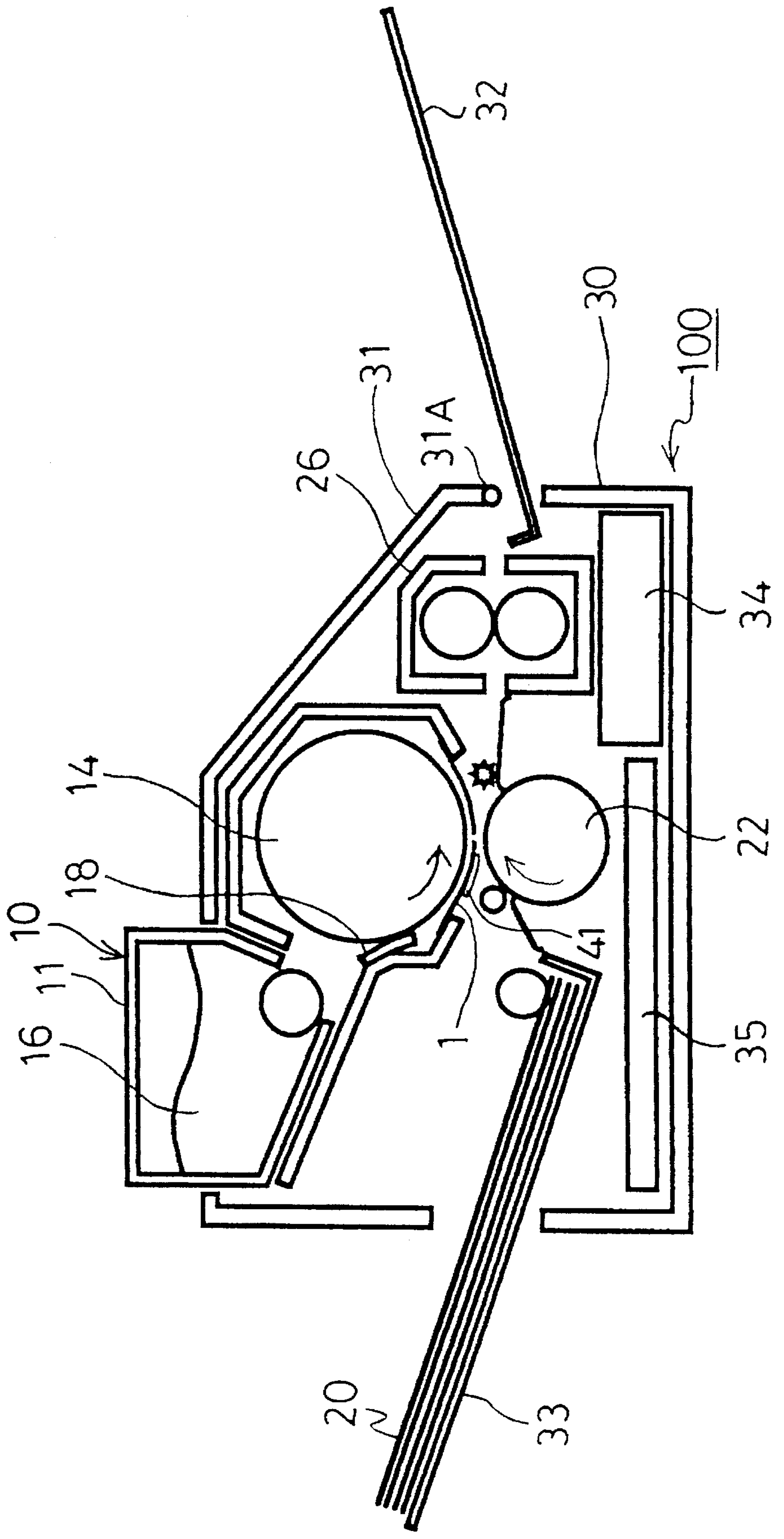
FIG. 6 is a schematic side view showing the construction of the image forming apparatus of another embodiment.
Figure 7:
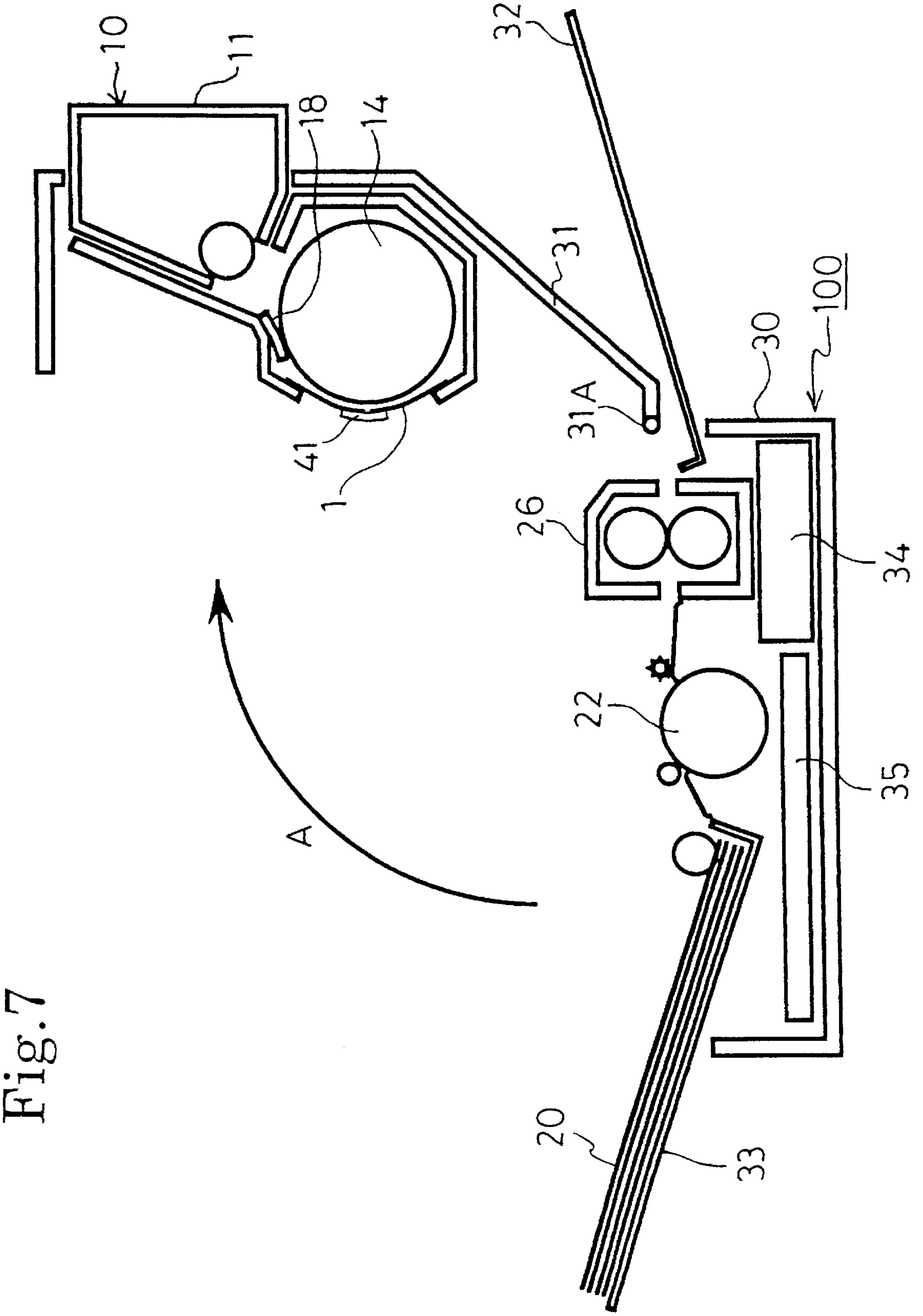
FIG. 7 is a schematic side view similar to FIG. 6 showing the state where a lid member is opened in the image forming apparatus of the embodiment shown in FIG. 6.

For example, in the above embodiment, the back electrode roller 22 is disposed on the lid member 31, and both the aperture electrode member 1 and the toner supply device 10 are disposed in the main body case 30. However, as shown in FIGS. 6 and 7, the back electrode roller 22 may be disposed in the main body case 30 while both the aperture electrode member 1 and the toner supply device 10 are disposed in the lid member 31. In this case, like the embodiment as described above, the cover 41 covers the apertures 6 when the lid member 31 is opened and is released when the lid member 31 is closed. Further, in this case, the press rod 46 is provided on the main body case 31. For supplementing the toner 16, the toner case 11 can be exchanged. Accordingly, in this case, the opening of the lid member 31 is carried out for a sheet jam and for cleaning the aperture electrodes 1.

Further, in the above embodiment, the control voltage to be applied to the apertures 6 corresponding to the non-image portion is set to 0 V. However, the control voltage may be set to a negative value. By applying a negative voltage, an image having reduced fog can be obtained. In addition, in the above embodiment, the aperture electrode member 1 having plural apertures 6 is used to control the toner flow. In place of this aperture electrode member 1, a mesh-shaped electrode member as disclosed in U.S. Pat. No. 5,036,341, for example, may be used with the opening portions of the mesh electrode member used as apertures.

What is claimed is:

1. An image forming apparatus comprising:

a lower frame;

an upper frame movably coupled to said lower frame;

a toner case for storing toner supported by one of said lower frame and said upper frame;

a toner carrier having a surface provided in said toner case for carrying toner on said surface thereof;

a toner flow controlling member having plurality of openings through which toner carried by said toner carrier is passed and control electrodes around said plurality of openings supported by said one of said lower frame and said upper frame;

a back electrode confronting said toner carrier and sandwiching said toner flow controlling member therebetween; and at least ones spacer provided on one of said toner flow controlling member and said back electrode, said back electrode being spaced away from said toner flow controlling member at a predetermined space by said at least one spacer, and said back electrode being supported by an other of said lower frame and said upper frame;

wherein said upper frame is connected to said lower frame such that said upper frame can be moved close to and away from said lower frame to allow access to said toner flow controlling member.

2. An image forming apparatus of claim 1 wherein said upper frame is pivotally secured to said lower frame.

3. An image forming apparatus of claim 1, wherein said at least one spacer being disposed between said back electrode and said toner flow controlling member to maintain a minimum spacing therebetween.

4. An image forming apparatus of claim 3 wherein said at least one spacer is coupled to said back electrode.

5. An image forming apparatus of claim 3 wherein said at least one spacer is coupled to said toner flow controlling member.

6. An image forming apparatus of claim 1 further comprising an electrode protection mechanism disposed adjacent said toner flow controlling member to selectively open and close said openings, and coupled to automatically move between an open position uncovering said openings when said upper frame is close to said lower frame and a closed position covering said openings when said upper frame is away from said lower frame.

7. An image forming apparatus of claim 1, wherein said toner carrier and said toner flow controlling member are supported by said lower frame, said back electrode is supported by said upper frame.

8. An image forming apparatus of claim 1, wherein said back electrode is supported by said lower frame, said toner case, said toner carrier and said toner flow controlling member are supported by said upper frame.

9. An image forming apparatus comprising:

a toner case for storing toner;

a toner carrier having a surface provided in said toner case for carrying toner on said surface thereof;

a toner flow controlling member having a plurality of openings through which toner carried by said toner carrier is passed and control electrodes around aid plurality of openings;

a back electrode confronting said toner carrier and sandwiching said toner flow controlling member therebetween, and said back electrode being spaced away from said toner flow controlling member at a predetermined space so that a printing medium can be fed through the predetermined space;

at least one spacer provided on one of said toner flow controlling member and said back electrode so as to avoid sandwiching the printing medium, said at least one spacer maintaining a minimum space between said toner flow controlling member and said back electrode at said predetermined space;

a first frame supporting said toner carrier and said toner flow controlling member; and a second frame supporting said back electrode, said second frame being connected to said first frame such that said second frame can be close to and away from said first frame.

10. An image forming apparatus of claim 9 wherein said at least one spacer is coupled to said back electrode.

11. An image forming apparatus of claim 9 wherein said at least one back electrode is a roller and said spacer is coupled to an edge of said roller.

12. An image forming apparatus of claim 9 wherein said at least one spacer is coupled to said toner flow controlling member.

13. An image forming apparatus of claim 9 further comprising an electrode protection mechanism disposed adjacent said toner flow controlling member to selectively open and close said openings, and coupled to automatically move between an open position uncovering said openings when said second frame is close to said first frame and a closed position covering said openings when said second frame is away from said first frame.

14. An image forming apparatus of claim 9 wherein said first frame is a lower frame and said second frame is an upper frame.

15. An image forming apparatus comprising:

a toner case for storing toner;

a toner carrier having a surface provided in said toner case for carrying toner on said surface thereof;

a toner flow controlling member having a plurality of openings through which toner carried by said toner carrier is passed and control electrodes around said plurality of openings;

a back electrode confronting said toner carrier and sandwiching said toner flow controlling member therebetween, and said back electrode being spaced away from said toner flow controlling member at a predetermined space so that a printing medium can be fed through the predetermined space;

a protection member movably supported to selectively cover said plurality of openings and said control electrodes;

a first frame supporting said toner carrier and said toner flow controlling member; and a second frame supporting said back electrode, said second frame being connected to said first frame such that said second frame can be moved close to and away from said first frame;

wherein said protection member covers said plurality of openings and said control electrodes when said second frame is away from said first frame, and said protection member is released from covering said plurality of openings and said control electrodes when said second frame is close to said first frame.

16. An image forming apparatus of claim 15 further comprising at least one spacer disposed between said back electrode and said toner flow controlling member that maintains a minimum spacing therebetween.

17. An image forming apparatus of claim 16 wherein said at least one spacer is coupled to said back electrode.

18. An image forming apparatus of claim 16 wherein said at least one spacer is coupled to said toner flow controlling member.

19. An image forming apparatus of claim 15 wherein said protection member is coupled to said toner case.

20. An image forming apparatus of claim 15 wherein said protection member comprises a lid disposed against a surface of said toner flow controlling member that is pivotally coupled to said toner case to selectively cover and uncover said openings in said toner flow controlling member.

21. An image forming apparatus of claim 20 wherein said protection member further comprises a spring coupled between said toner case and said lid to normally bias said lid to cover said openings.

22. An image forming apparatus of claim 20 wherein said protection member further comprises a lever coupled to said lid and said second frame comprises a rod extending therefrom, and wherein upon moving said second frame close to said first frame, said rod engages said lever to pivot said lid to uncover said openings.

23. An image forming apparatus of claim 15 wherein said protection member is coupled to said toner case to automatically cover said openings when said second frame is moved away from said first frame and to automatically uncover said openings when said second frame is moved close to said first frame.

24. An image forming apparatus of claim 15 wherein said first frame is a lower frame and said second frame is an upper frame.

* * * * *